July 12, 1927.

G. W. ZIEGLER

EDUCATIONAL GAME

Filed June 9, 1926     2 Sheets-Sheet 1

1,635,735

Inventor:
George W. Ziegler
by Hazard and Miller
Attorneys

Witness:

July 12, 1927.

G. W. ZIEGLER

EDUCATIONAL GAME

Filed June 9, 1926

Inventor.
George W. Ziegler.
by Haynes and Miller
Attorneys.

Patented July 12, 1927.

1,635,735

UNITED STATES PATENT OFFICE.

GEORGE W. ZIEGLER, OF LONG BEACH, CALIFORNIA.

EDUCATIONAL GAME.

Application filed June 9, 1926. Serial No. 114,648.

My invention is an educational game designed to give amusement and at the same time inculcate educational features on the players. While the game is chiefly designed for children, it is also instructive and amusing for adults and a great variety of games can be played.

An object of my invention is an educational game which will be available for teaching spelling, simple arithmetic, geography and in some cases history. Other features may be embodied such as naming different articles, etc.

The present game may be considered as divided into two parts having a roulette type of device in which a spinning arrow is designed to rotate over a table, this table having various indicia on the circumference of the spin of the arrow indicating different features where the arrow stops.

The game also requires a series of discs which may be placed over the arrow support, these discs containing words to be spelled and arithmetical problems or the like. This board or table also has a series of pictures or the like representing different features of geographical interest, pictures of different people noted in history, maps and pictures of various articles. The other part of the game embodies a table or board having in the center the goal represented by a picture of a school house and a path leading outwardly from the center in a more or less spiraled formation. This however, I prefer to form with rectangular boundaries. The path is divided preferably into about 100 stations, each of these stations being numbered and most of them having some feature of educational value pictured thereon, or else designating some question.

Adjacent the paths there are boundary lines, different places on the boundary lines being marked with different school grades, the highest grade being near the goal, that is the school house or the like. Each side of the board is provided with a series of indicia in the form of letters and numerals and a device indicating arithmetical problems may also be mounted on this board. The game is played with game pieces designated as men or students or the like.

My invention will be more readily understood from the following description and drawings, in which.

Figure 1:
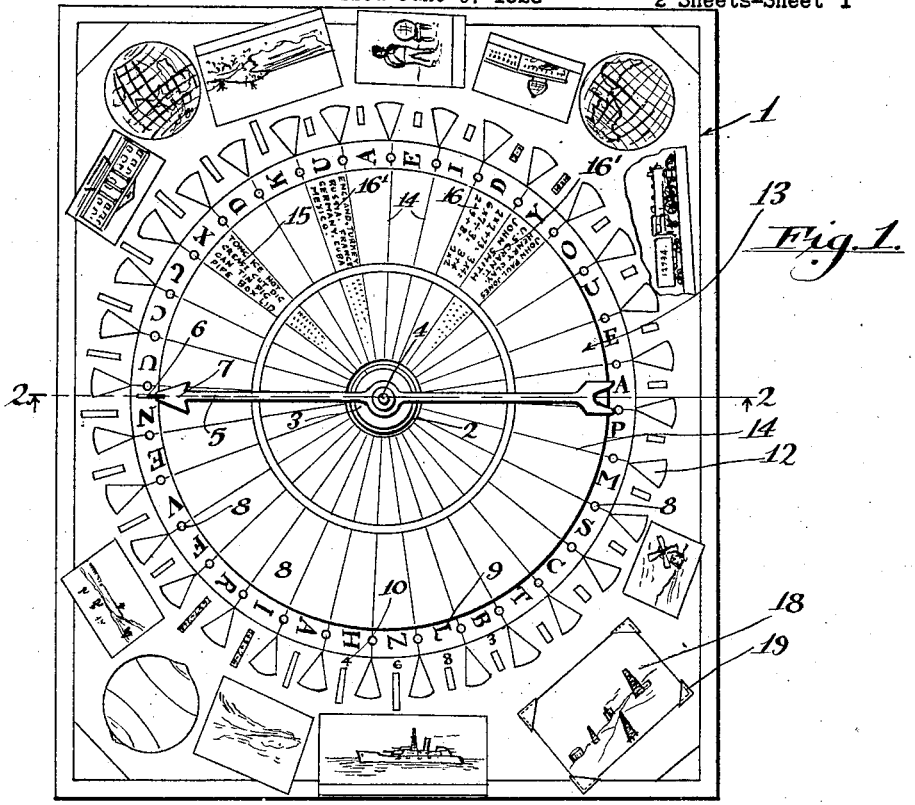
Figure 1 is a plan view of the roulette board indicating by the arrow the various indicia, the words to be spelled, arithmetical problems, the various pictures, maps, etc.

The game board of Fig. 1 is constructed substantially as follows:

This has a suitable strong rectangular board 1 which may be made of heavy cardboard or the like or of other suitable material. A block 2 is mounted in the center having a plate 3 thereon to which is screw threaded a stud 4 and on this stud is mounted an arrow 5 having a pliable strip of material 6 secured to the arrow head 7. This strip is positioned to engage a circumferential row of pins 8 secured to the board and after spinning of the arrow causing same to stop between adjacent pins. A series of letters 9 and also a series of numerals 10 are arranged circumferenially around the board between the arrows. A series of arithmetical or algebraic or other problems are marked in the spaces between adjacent pins. The triangular shaped devices 12 are preferably of different colors in order to teach children different colors and blending of colors.

A disc 13 is mounted on the board, there being one of these discs preferably pasted on and having markings of radial boundary lines 14, such lines extending from the center to each of the pins. A series of words 15 are written in these spaces or a series of arithmetical or other problems 16 or the like. There may also be a series of radial spaces 16' with names of historical personages and other spaces 16" with names of geographical features or the like. Other radial spaces may be left for various other educational questions.

Figure 3:
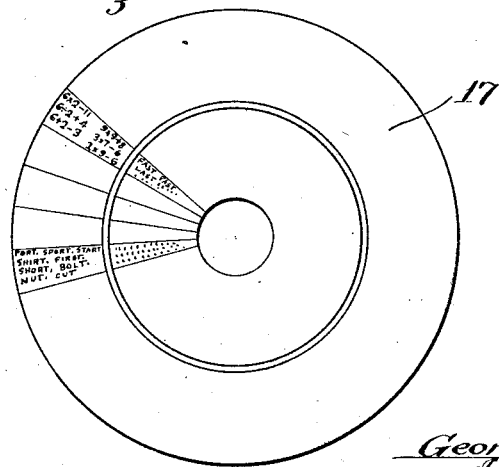
Fig. 3 is a plan view of extra discs having different words for spelling and different arithmetical or algebraic problems.

Extra sheets or discs designated by the numeral 17 are shown in Fig. 3 in order to give a variety to the words to be spelled and to the various problems. These sheets will preferably be arranged with words suitable to the different school grades and also with problems suitable to such grades so that the children in lower and higher grades may play the games with words and problems with which they would be familiar, thus covering all the words and substantially all the problems a child would meet with in the whole school course.

There will also be other discs having pictures of flags of different nations and animals, flowers, plants, etc. These may be practically unlimited as to the objects indicated.

Figure 4:
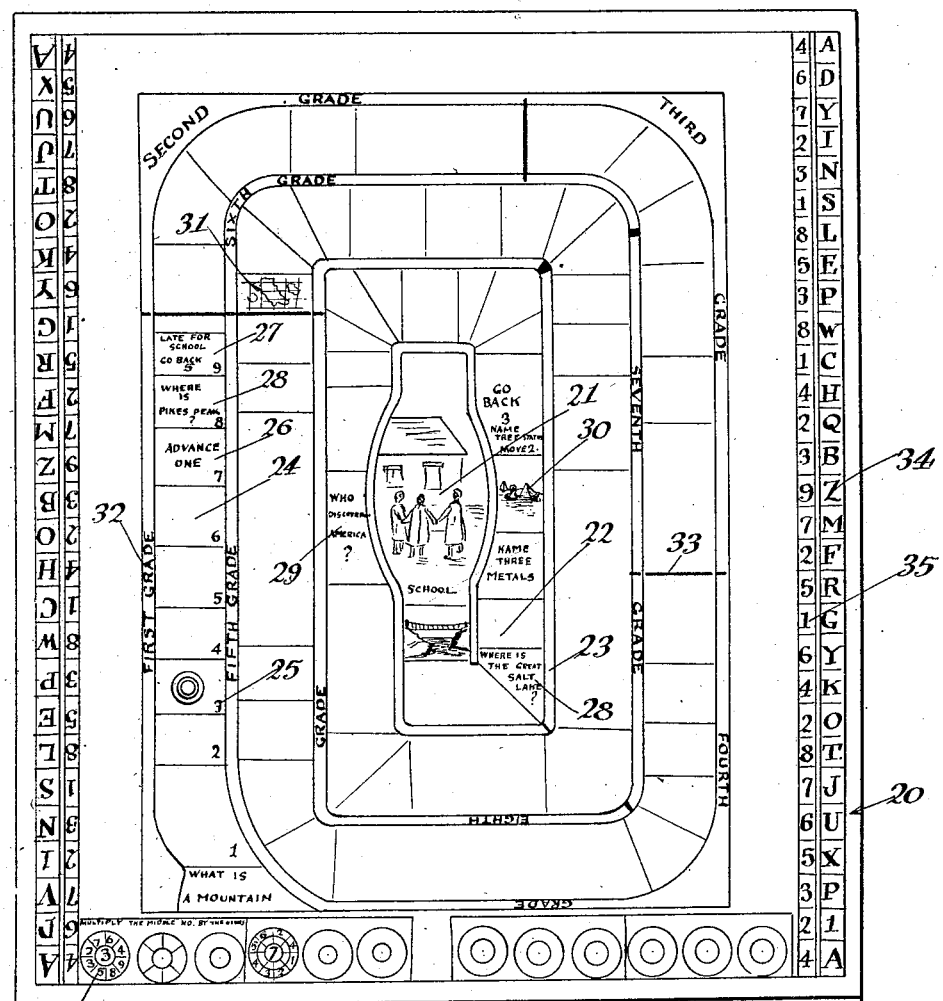
Fig. 4 is a plan view of the board having the "moves," on which the men or the like are advanced towards the goal.

On the board outside of the devices above mentioned or in other suitable places are a series of pictures 18 which may designate certain features mentioned on the board of Fig. 4, showing elements involved in geography such as mountains, lakes, rivers, islands, etc., or pictures of people noted in history, maps, pictures of different articles and other features educational to a child. It will be apparent that a large variety of these pictures may be secured on the board and if desired the board may be provided with corner clips 19 pasted thereon in which picture cards or the like may be inserted, gripping the corners thereof, thus allowing changing of the pictures, maps and other devices marked thereon.

Figure 5:
Fig. 5 is an end elevation of Fig. 4.

The board of Figs. 4 and 5 designated generally by the numeral 20 is of heavy cardboard or the like and in the center has the goal 21 which is illustrated by a picture of a school house with children playing, or any other suitable picture. A path 22 extends outwardly from the goal in a spiral path, this spiral however, being shown forming rectangles and having boundary lines 23. The paths have a series of stations 24, each of these being designated by a numeral 25, it being preferable to have 100 stations. These stations have different designations thereon, for instance, 26 gives a direction to advance, 27 shows a designation to go back, 28 indicates geographical questions involving the use of the maps shown on the board of Fig. 1; 29 designates a question in history. There are also a series of pictures indicated by the numeral 30 which may show different animals or features of geography, historical personages, etc., and answering some of the questions. It is also desirable to have a series of comic pictures giving amusement to children when the playing piece stops on such picture.

There will also be small maps 31 of use in answering the geographical questions.

It will therefore be apparent that in picture form there may be embodied in the 100 stations a large number of items of interest and of educational value and also a number of questions which involve these pictures and also the pictures on the board of Fig. 1.

On the boundary lines 23 there are words such as 32 or the like, indicating the different school grades from the first grade to the highest, the highest grade being in the boundary adjacent the school house. A series of heavy cross lines 33 indicate the boundaries of each grade, it being considered a promotion to advance over such cross lines.

On each side of the board are a series of alphabetical letters 34 and adjacent thereto a series of numbers of the like 35. The various circular figures 36 at the bottom of the board have different arithmetical problems which may enter into the games.

A large number of games may be played with the apparatus illustrated and described, some of these will be set forth to indicate how the appliance may be utilized. A spelling game would be conducted substantially as follows, and may be played by two or more players;

The arrow is spun and comes to rest between any two of the pegs and thus point to a letter and to a number and is also positioned over the spaces having the words 15. The person spinning the arrow designates how many words the player is to spell by the numerals 10 at the side and also informs the player of the letter. Such player may then look on the board 20 and verify by the numbers 35 the number of words to be spelled. The spinner then reads the designated number of words 15 and if the player spells these correctly he moves a man on the path the designated number of spaces, these being equal to the number of words to be spelled. For each word incorrectly spelled he moves one less space.

It will be understood that the men or the like will be of different colors for different players. If it is desired to play the game with strictness and if a word is misspelled the player may lose his move entirely and give the next player an opportunity. Such a game may be conducted until the school house is reached as a spelling game, the players being given a new spin should the arrow stop on arithmetical or other problems.

Another game is a game of arithmetic, algebra or other suitable problems, the arrow being spun in the same manner either by the player concerned or by some other person and the problems 11 may be required to be solved, in which case the player may advance the number of spaces designated by the numeral adjacent the problem when giving a correct solution, or the player may be required to solve as many of the problems 16 as are designated by the numeral 10 to which the arrow points, the men being moved on the board 20 the number of stations designated by the marginal numbers 10 for a correct solution and either having no move or falling back one station for each incorrect answer. It will be apparent that the spelling, arithmetical or other problems may be combined.

The game may be utilized in a game of building words. In this case the arrow is spun and the different letters opposite which it stops are written down by each of the players until a certain designated number of letters have been recorded. Then each player endeavors in a certain length of time to combine these letters into words. The one developing the larger number of words is declared the winner.

Miscellaneous games may be played by combining the spelling, the mathematical and by embodying the historical and geographical questions as indicated at 16' and 16'', and also any other questions so indicated. If the player answers these questions or the designated number of same correctly his man is advanced on the board 20 an equivalent number of spaces. The various pictures, maps, etc., on the two boards are an aid to the children in locating these various historical personages, geographical pictures and other items of educational value.

Figure 2:
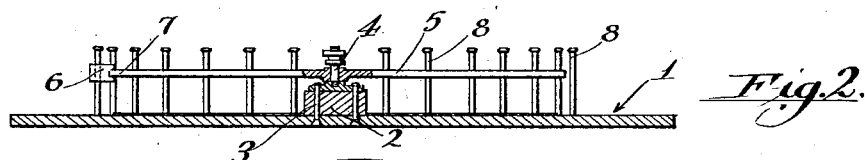
Fig. 2 is a cross section on the line 2—2 of Fig. 1.

It is manifest that very many other games or types of games could be played with the board 1, utilizing the appliances illustrated in Figs. 1, 2 and 3 by itself, or combining this with the board 20 and the various devices illustrated in Fig. 4. Such changes however, would be within the spirit of my invention as set forth in the description, drawings and claims.

Having described my invention, what I claim is:

1. A game comprising in combination, a board having a rotating pointer, a disc on the board having a series of radial segments with words thereon, numerals opposite the segments indicating a number of words to be spelled, the disc having also a series of printed instructions or problems with numerals associated therewith to indicate the number of problems or the like to be solved in accordance with the position of the pointer, a second board having a path leading to the goal, the path having a series of stations, said stations being numbered, and playing implements to be advanced on said stations in accordance with the correct spelling, the problem, and position of the pointer on the first board.

2. A game comprising in combination a board having a rotatable pointer, a series of indicating numerals circumferentially of the swing of the pointer, a disc having a series of printed instructions or problems, the numeral indicating the number of problems or the like, to be solved in accordance with the position of the pointer, a second board having a path leading to a goal, the path having a series of stations, said stations being numbered, and playing implements to be advanced on said stations in accordance with the problem and the position of the pointer on the first board.

3. A game comprising in combination a board having a rotating pointer, a disc on the board having a series of radial segments with the words thereon, numerals opposite the segments indicating a number of words to be spelled, a second board having a path leading to a goal, the path having a series of stations and playing pieces to be advanced along said path to the different stations in accordance with the number of words correctly spelled.

4. A game comprising in combination a board having a rotatable pointer, a series of mathematical problems with answers represented thereon opposite which the pointer may stop, a second board having a path leading to a goal, with a series of stations therealong, and playing pieces to be advanced along the path in accordance with the correct solution of the problems.

5. A game comprising in combination a board having a rotatable pointer, a disc on the board having radial spaces with geographical, historical or similar questions indicated thereon, numbers positioned radially in regard to said questions, a second board having a path leading to a goal with a series of stations, and playing pieces to be advanced along said path in accordance with the answers to the questions and the indicating numbers designating the number of stations moved.

6. A game comprising in combination a board having a rotary pointer, a series of radial spaces, segmental in shape, on the board, various questions or mathematical problems with answers printed in said spaces adapted to be covered by the pointer, a second board having a continuous path ending in a goal, the path having a series of stations, some of these stations having printed further instructions for moves and playing pieces to be advanced along the path in accordance with the solution of the problem or the like on the first board and to be moved in accordance with the instructions on the various stations.

7. In a game, a board having a rotatable pointer, a series of indicating numerals circumferentially of the swing of the pointer, a disc having a series of printed instructions or problems, the numeral indicating the number of problems or the like to be solved in accordance with the position of the pointer.

8. In a game, a board having a rotating pointer, a disc on the board having a series of radial segments with words thereon, and numerals opposite the segments indicating a number of words to be spelled.

9. In a game, a board having a rotatable pointer, a disc on the board having radial spaces with geographical, historical, or similar questions indicated thereon, numbers positioned radially in regard to said questions indicating the number of said questions to be solved in accordance with the position of the pointer.

10. In a game, a board having a rotatable pointer, a disc on the board having a series of radial segments, some of the segments having words thereon, others of the segments having geographical, historical, or similar questions, others of said segments having arithmetical problems, and a series of numerals adjacent the radial segments to indicate the number of words to be spelled, questions to be answered, or problems to be solved, in relation to the position of the pointer.

In testimony whereof I have signed my name to this specification.

GEORGE W. ZIEGLER.